United States Patent
Ikeda et al.

(10) Patent No.: US 7,667,413 B2
(45) Date of Patent: Feb. 23, 2010

(54) HIGH PRESSURE DISCHARGE LAMP OPERATION METHOD, OPERATION DEVICE, LIGHT SOURCE DEVICE, AND PROJECTION TYPE IMAGE DISPLAY DEVICE

(75) Inventors: Masaru Ikeda, Osaka (JP); Syunsuke Ono, Osaka (JP); Minoru Ozasa, Kyoto (JP); Masahiro Yamamoto, Osaka (JP); Go Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 11/916,712

(22) PCT Filed: Jul. 11, 2006

(86) PCT No.: PCT/JP2006/313744

§ 371 (c)(1),
(2), (4) Date: Dec. 6, 2007

(87) PCT Pub. No.: WO2007/010781

PCT Pub. Date: Jan. 25, 2007

(65) Prior Publication Data

US 2009/0115974 A1 May 7, 2009

(30) Foreign Application Priority Data

Jul. 15, 2005 (JP) .............................. 2005-207414

(51) Int. Cl.
*H05B 37/02* (2006.01)
(52) U.S. Cl. .................. 315/293; 315/308; 315/360
(58) Field of Classification Search ............. 315/209 R, 315/224–226, 246, 291, 293, 307, 308, 360, 315/DIG. 7
See application file for complete search history.

(56) References Cited

U.S. PATENT DOCUMENTS

| 5,491,388 | A | * | 2/1996 | Nobuyuki et al. | ........... 315/308 |
| 6,153,987 | A | * | 11/2000 | Toda et al. | ........... 315/308 |
| 6,750,620 | B2 | * | 6/2004 | Suzuki | ........... 315/291 |
| 6,914,395 | B2 | * | 7/2005 | Yamauchi et al. | ........... 315/308 |
| 7,301,289 | B2 | * | 11/2007 | Okamoto et al. | ........... 315/291 |
| 2001/0038267 | A1 | | 11/2001 | Ono et al. | |
| 2004/0090184 | A1 | | 5/2004 | Arimoto et al. | |
| 2005/0023993 | A1 | | 2/2005 | Ono et al. | |
| 2005/0140311 | A1 | | 6/2005 | Suzuki et al. | |

(Continued)

FOREIGN PATENT DOCUMENTS

JP 9-330795 12/1997

(Continued)

*Primary Examiner*—Thuy Vinh Tran

(57) ABSTRACT

Provided is a method for lighting a high pressure discharge lamp capable of increasing the life thereof. The lighting method is as follows. When the time elapse after lighting up the discharge lamp is within a predetermined condition (e.g. 5 minutes or less), constant current control is performed if the lamp voltage is lower than switching voltage (here, a first voltage value V1) and constant power control is performed to maintain the lamp power at a power value W1 if the lamp voltage is equal to or above the switching voltage. After the predetermined condition (5 minutes) is exceeded, the constant power control is performed by lowering the value of the switching voltage from the first voltage value V1 to the second voltage value V2. If the lamp voltage is equal to or above the switching voltage lowered, the lamp power is maintained at power value W1.

7 Claims, 14 Drawing Sheets

U.S. PATENT DOCUMENTS

2007/0164687 A1    7/2007    Watanabe et al.

FOREIGN PATENT DOCUMENTS

| | | |
|---|---|---|
| JP | 2001-312997 | 11/2001 |
| JP | 2004-172086 | 6/2004 |
| JP | 2005-32711 | 2/2005 |
| JP | 2005-38815 | 2/2005 |
| JP | 2005-122997 | 5/2005 |
| JP | 2005-190766 | 7/2005 |

\* cited by examiner

POWER SETTING SIGNAL

FIG.9

| LIGHTING METHOD | ACCUMULATED OPERATING TIME / CHARACTERISTICS | AFTER 5 min | AFTER 1 h | AFTER 5 h | AFTER 10 h | AFTER 15 h | AFTER 20 h | AFTER 30 h | AFTER 35 h |
|---|---|---|---|---|---|---|---|---|---|
| A | LAMP VOLTAGE (V) | 95 | 89 | 85 | 80 | 75 | 60 | 65 | 70 |
| | LAMP POWER (W) | 300 | 300 | 300 | 300 | 300 | 300 | 300 | 300 |
| | CENTRAL ILLUMINANCE (lx) | 15000 | 15500 | 15700 | 16000 | 16500 | 17000 | 16500 | 16000 |
| | LAMP CONDITION | NORMAL | NORMAL | NORMAL | NORMAL | NORMAL | NORMAL | NORMAL | NORMAL |
| B | LAMP VOLTAGE (V) | 100 | 95 | 90 | 80 | 76 | 63 | 58 | 60 |
| | LAMP POWER (W) | 300 | 300 | 300 | 300 | 300 | 252 | 232 | 240 |
| | CENTRAL ILLUMINANCE (lx) | 14500 | 15000 | 15300 | 16000 | 16500 | 12000 | 11000 | 7000 |
| | LAMP CONDITION | NORMAL | NORMAL | NORMAL | NORMAL | BLACKENING STARTS | BLACKENING | BLACKENING | BLACKENING |

US 7,667,413 B2

HIGH PRESSURE DISCHARGE LAMP OPERATION METHOD, OPERATION DEVICE, LIGHT SOURCE DEVICE, AND PROJECTION TYPE IMAGE DISPLAY DEVICE

This application is a National Phase application filed under 35 U.S.C. 371 claiming the benefit of PCT/JP2006/313744 filed on Jul. 11, 2006, which has priority based on Japan application 2005-207414 filed on Jul. 15, 2005.

TECHNICAL FIELD

The present invention relates to a lighting method, lighting apparatus, and light-source apparatus for a high-pressure discharge lamp and a projection-type image display apparatus.

BACKGROUND ART

In recent years, high-pressure mercury lamps have been widely used as a light source for liquid crystal panels, DLP (Digital Light Processing: Registered Trademark) projection-type display apparatuses and the like.

For example, the above-mentioned high-pressure mercury lamp (hereinafter, simply referred to as "lamp") is composed of a bulb made of a quartz glass, including therein a pair of tungsten electrodes and enclosing a rare gas such as mercury or argon and a halogen such as bromine. The pair of tungsten electrodes are disposed opposing each other with a predetermined gap in between.

Also, the above lighting apparatus normally performs a control on a lamp voltage and a lamp power such that a control characteristic is as shown in FIG. 13. That is to say, when the lamp voltage is lower than a first voltage value V1, a constant current control is performed so as to increase the lamp voltage and power linearly; when the lamp voltage is equal to or higher than the first voltage value V1, a constant power control is performed to maintain the lamp power at a power value W1. Note that a point at which the lamp voltage is equal to the first voltage V1 and the lamp power is equal to the power value W1 is, in other words, a switching point at which the constant current control is switched to the constant power control.

On the other hand, in the lamp, a protuberance is formed and grows at a tip of the opposing electrodes in the bulb (for an example, refer to Patent Document 2) as operating time (in the present specification, "operating time" is a period of time during which a discharge of a lamp is maintained) increases. Formation of such a protuberance shortens a distance between the electrodes, lowering the lamp voltage as a result.

Moreover, when the lamp voltage lowers further as the discharge of the lamp is maintained and the operating time progresses further, the lamp voltage becomes lower than the first voltage value V1, the switching criterion between the constant current control and the constant power control, resulting in a change of the control from the currently-performed constant power control to the constant current control.

As a result, an optical output (illuminance) may decline due to a lack of power applied to the lamp, and a life of the lamp may be shortened by a so-called "blackening phenomenon" caused by a fall in a lamp temperature also due to the lack of power.

In attempts to solve these problems, some techniques have been disclosed. For example, one such technique changes an operating frequency to supplement the fall of the lamp voltage when the lamp voltage falls due to the formation of a protuberance (Patent Document 1). Another such technique lowers the operating frequency of the lamp to raise the lamp voltage when the lamp voltage falls below the first voltage value V1, the switching point from the constant current control to the constant power control (Patent Document 2).

Patent Document 1: Japanese Laid-Open Patent Application Publication No. 2001-312997

Patent Document 2: Japanese Laid-Open Patent Application Publication No. 2004-172086

DISCLOSURE OF THE INVENTION

Problems the Invention is Going to Solve

However, the above methods of changing the operating frequency cannot be applied to a projection-type image display apparatus of a digital image projection type using a micromirror display device, namely the DLP (registered trademark) type, which has been coming into use in recent years.

Here, a DLP (registered trademark) projection-type image display apparatus using a DMD (Digital Micromirror Device: registered trademark) will be briefly described.

FIG. 14 is a schematic diagram showing an image display method of the projection-type display apparatus.

The projection-type display apparatus is a DLP (registered trademark) type apparatus constituted from a lamp unit 901, a color wheel 902, a DMD (registered trademark) 903, a projection lens 904 and others.

The color wheel 902 which is basically composed of red (R), green (G), and blue (B) rotates at a predetermined constant speed (for instance, 120 rotations per second for a 60 Hz video image) and emits single-color light of red, green, and blue to the DMD (registered trademark) 903 by being irradiated by the lamp unit 901.

The DMD (registered trademark) 903, a micromirror display device, has a mirror function which absorbs incident light when OFF and reflects incident light when ON, an amount of the reflection being adjusted according to a weight of an inputted signal. Accordingly, the single-color light emitted from the color wheel 902 is reflected to the projection lens 904 as a single color of a predetermined grayscale based on the inputted signal weighed in accordance with an image for display.

After that, respective single-color lights emitted from the rotating color wheel 902 are composited to display the image on a screen. When the image is displayed on the screen, human eyes perceive each time-divided image of red, green, and blue as an afterimage, thus are unable to recognize a flicker occurring during the time-divisions of red, green, and blue. As a result, a color image is perceived.

On the other hand, when a discharge of the lamp used as a light source is maintained with an alternate current, illuminance changes when polarities of a current waveform reverse, resulting in generation of a flicker on the screen. In order to eliminate this flicker, the DLP (registered trademark) type display apparatus synchronizes a color-changing timing of the color wheel 902 and a reverse timing of the polarities of the current waveform. In other words, because the rotation number of the color wheel 902 is constant, a lighting method with a fixed operating frequency is required.

Accordingly, a lighting method in which a conventional technique of changing the frequency is used cannot be applied to the DLP (registered trademark) projection-type display apparatus, as the operating frequency is changed when the lamp voltage lowers.

The present invention was conceived in view of the above problem, and aims to offer a lighting method which can suppress a decline in an optical output and a shortening of a lamp life without changing the operating frequency of the lamp.

Means of Solving the Problems

The above-stated aim can be achieved by a lighting method of the present invention for a high-pressure discharge lamp, in which, after the high-pressure discharge lamp has been lighted up, i) when a lamp voltage is below a predetermined switching voltage, a constant current control is performed, and ii) when the lamp voltage is equal to or above the predetermined switching voltage, the constant current control is switched to a constant power control to maintain a discharge of the high-pressure discharge lamp, wherein after the high-pressure discharge lamp has been lighted up, i) when a predetermined condition is not met, the switching voltage is set to a first voltage value V1, and ii) when the predetermined condition is met, the switching voltage is set to a second voltage value V2 (V2<V1).

Also, the predetermined condition is met when one of i) an illuminance of the high-pressured discharge lamp, ii) a temperature of the high-pressured discharge lamp, and iii) a lamp voltage of the high-pressured discharge lamp reaches a stable state.

Additionally, the predetermined condition is met when the discharge of the high-pressure discharge lamp has been maintained for more than 5 minutes after being lighted up.

Meanwhile, the above-mentioned aim can be achieved by a lighting apparatus of the present invention for a high-pressure discharge lamp, in which, after the high-pressure discharge lamp has been lighted up, i) when a lamp voltage is below a predetermined switching voltage, a constant current control is performed, and ii) when the lamp voltage is equal to or above the predetermined switching voltage, the constant current control is switched to a constant power control to maintain a discharge of the high-pressure discharge lamp, the lighting apparatus comprising: a judging unit operable to judge whether or not a predetermined condition is met after the high-pressure discharge lamp has been lighted up; and a voltage-switching setting unit operable to i) set the switching voltage to a first voltage value V1 when the predetermined condition is not met, and ii) set the switching voltage to a second voltage value V2 (V2<V1) when the predetermined condition is met.

Also, in order to achieve the above-described aim, a light-source apparatus of the present invention comprises a high-pressure discharge lamp and a lighting apparatus for lighting the high-pressure discharge lamp. Here, the lighting apparatus is the above-mentioned lighting apparatus.

Also, in order to achieve the above-described aim, a projection-type image display apparatus of the present invention includes the above-mentioned light-source apparatus and adopts a digital image projection method using a micromirror display device.

Effects of the Invention

According to the lighting method of the present invention, even when the lighting voltage falls below the first voltage value V1 due to a shortened distance between the lamp electrodes caused by formation of the protuberance over the course of the operating time, as long as a predetermined condition is satisfied, the switching voltage is changed to the second voltage value V2, which is lower than the first voltage value V1. Consequently, the discharge of the high-pressure discharge lamp is maintained by the constant power control, and the life can be maintained by suppressing a decline in the optical output and a shortening of the life due to blackening.

According to the lighting apparatus of the present invention, even when the lighting voltage falls below the first voltage value V1 due to a shortened distance between the lamp electrodes caused by formation of the protuberance over the course of the operating time, as long as a predetermined condition is satisfied, the switching voltage is changed to the second voltage value V2, which is lower than the first voltage value V1. Consequently, the discharge of the high-pressure discharge lamp is maintained by the constant power control, and the life can be maintained by suppressing a decline in the optical output and a shortening of the life due to blackening.

BRIEF DESCRIPTION OF THE DRAWINGS

FIG. 9 is a diagram showing a result of a comparative test;

DESCRIPTION OF REFERENCE NUMERALS

Figure 1:
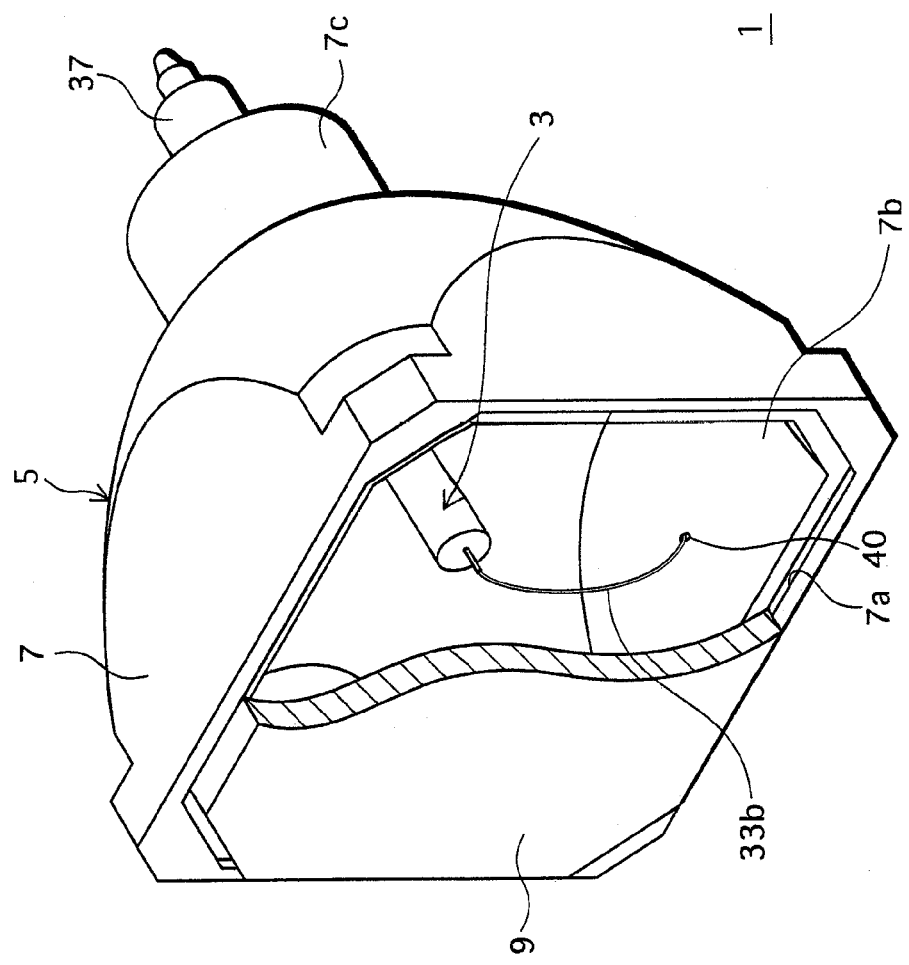
FIG. 1 is a perspective view of a lamp unit in a first embodiment.

1 . . . lamp unit
3 . . . high-pressure mercury lamp
902 . . . color wheel
50 . . . lighting apparatus
58 . . . current detector
59 . . . voltage detector
60 . . . power control setter
61 . . . timer
63 . . . controller
100 . . . front-projection type image display apparatus
150 . . . rear-projection type image display apparatus

BEST MODE FOR CARRYING OUT THE INVENTION

In a first embodiment below, the lighting apparatus using the lighting method for the high-pressure discharge lamp in accordance with the present invention is described; and in a second embodiment, a front-projection type image display apparatus using the above-mentioned lighting apparatus is described.

First Embodiment

The present embodiment describes a lamp provided in a lamp unit, and a lighting method and lighting apparatus for the lamp.

In the present embodiment, a lamp unit using a high-pressure mercury lamp in accordance with the present invention is described with reference to drawings.

1. Structure of Lamp Unit

FIG. 1 is a perspective view of the lamp unit in the present embodiment.

The lamp unit 1, as shown in FIG. 1, includes a high-pressure mercury lamp (hereinafter, simply referred to as "lamp") 3 and a reflecting mirror 5, where the lamp 3 is built in the reflecting mirror 5.

Figure 2:
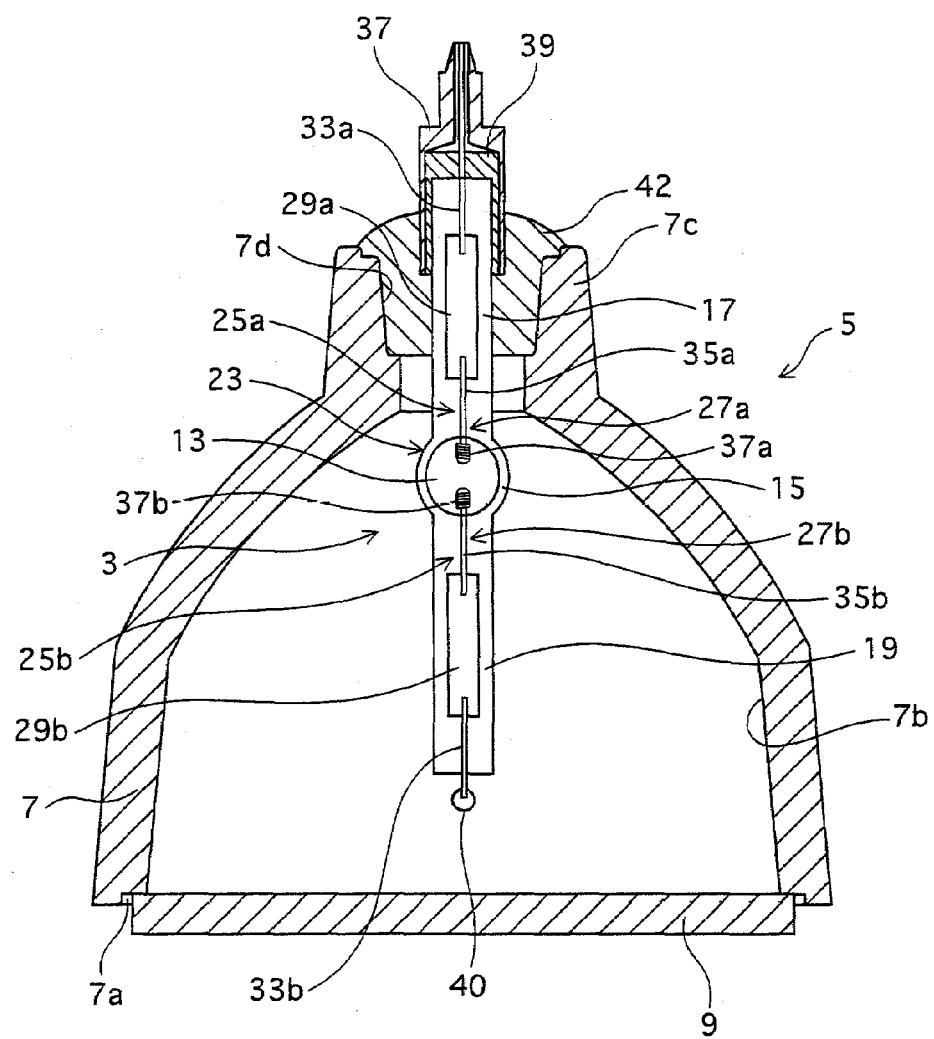
FIG. 2 is a plan view of the lamp unit, where a reflecting mirror is cut away so as to provide an inner view of the lamp.

FIG. 2 is a plan view of the lamp unit, where the reflecting mirror is cut away so as to provide a clear view of an inner structure of the lamp.

1-1. Structure of Lamp

As shown in FIG. 2, the lamp 3 includes a discharge vessel 23 which has a discharge space 13 therein and electrode assemblies 25a and 25b. The electrode assemblies 25a and 25b are hermetically sealed with two sealing parts 17 and 19 such that the tips (electrode parts which will be described later) face each other in the discharge space 13.

The discharge vessel 23 is composed of a light-emitting part 15 of a substantially spheroidal form and the sealing parts 17 and 19 provided at opposite sides of the light-emitting part 15, which has the discharge space 13 therein.

Note that a light-emitting material, a starting gas, and a halogen gas for a halogen cycle are enclosed in the discharge space 13.

The electrode assembly 25a is composed of an electrode part 27a, a metal foil 29a, and an external lead 33a which are connected (and fixed by, for example, welding) to one another in the stated order. Similarly, the electrode assembly 25b is composed of an electrode part 27b, a metal foil 29b, and an external lead 33b which are connected (and fixed by, for example, welding) to one another in the stated order. It should be noted here that the tips of the electrode assemblies 25a and 25b are the electrode parts 27a and 27b (which correspond to "electrodes" in the present invention).

The external leads 33a and 33b extend to outside from the outer ends of the sealing parts 17 and 19, to an opposite direction from the light-emitting part 15. It should be noted that, as shown in FIGS. 1 and 2, the external lead 33b passes through a through hole 40 formed in a main body member 7 and extends to outside of the reflecting mirror 5.

The electrode part 27a includes an electrode rod 35a and an electrode coil 37a that is provided at the tip of the electrode rod 35a; and the electrode part 27b includes an electrode rod 35b and an electrode coil 37b that is provided at the tip of the electrode rod 35b. The electrode parts 27a and 27b are disposed to align substantially in a straight line to face each other in the discharge space 13. It should be noted here that the electrode rods and the electrode coils may be made from the same material or from different materials.

The electrode assemblies 25a and 25b (mainly the metal foils 29a and 29b thereof) are hermetically sealed to the sealing parts 17 and 19 respectively such that the electrode coils 37a and 37b have a predetermined distance in between. With this sealing, the discharge space 13 is formed in the light-emitting part 15, and as shown in FIG. 2, the electrode parts 27a and 27b extend into the discharge space 13 from the sealing parts 17 and 19, respectively.

Also, a base 37 is fixed to the outer end of the sealing part 17 via cement 39 so as to cover the outer end, and the external lead 33a is connected to the base 37. It should be noted here that the base is fixed to any one of the two outer ends of the sealing parts.

1-2. Structure of Reflecting Mirror

As shown in FIGS. 1 and 2, the reflecting mirror 5 includes the main body member 7 which has a reflecting surface 7b being a concave surface, and a front glass 9 is provided at an opening 7a of the main body member 7. The front glass 9 is bonded with the main body member 7 by, for example, a silicon-based adhesive.

The reflecting mirror 5 is, for example, a dichroic reflecting mirror, and reflects light, which comes from the light-emitting part 15 of the lamp 3, in a predetermined direction (toward the front glass 9). The main body member 7 is in a shape of a funnel. As shown in FIG. 2, a through hole 7d is formed in a part (hereinafter referred to as "base part of the main body member") 7c having a small diameter. The sealing part 17 of the lamp 3 is inserted through the through hole 7d.

As shown in FIG. 2, the lamp 3 is fixed to the reflecting mirror 5 by, for example, cement 42 while the sealing part 17, to which the base 37 has been fixed, is inserted to a predetermined position in the through hole 7d of the base part 7c of the main body member 7.

2. Lighting Method for Lamp

Described next is a lighting method for the high-pressure mercury lamp 3.

Figure 3:
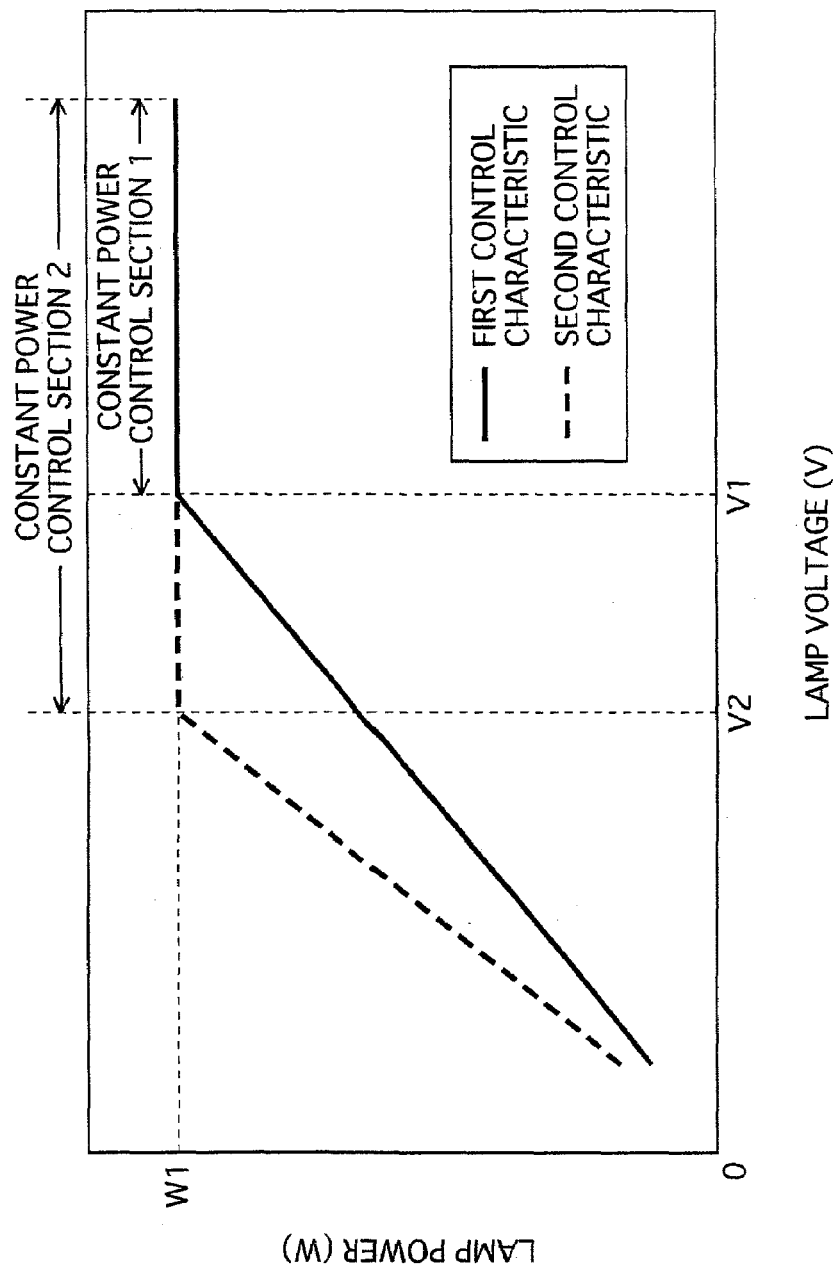
FIG. 3 is a diagram showing control characteristics of a high-pressure mercury lamp.

FIG. 3 is a diagram showing control characteristics of a high-pressure mercury lamp and is a correlation diagram between the lamp voltage and lamp power supplied after generating a breakdown between the electrode parts 27a and 27b by applying a high-voltage pulse to the lamp 3. The above control characteristic is performed by a lighting apparatus which will be described later. It should be noted here that an operating frequency for the lamp is constant.

From the start of lamp operation till a predetermined condition is met, the lighting method according to the present invention controls the lamp voltage and the like based on a first control characteristic, which is shown as a solid line in FIG. 3. And, after the predetermined condition is met, the lighting method begins to control the lamp voltage and the like based on a second control characteristic, which is shown as a dotted line in FIG. 3.

It should be noted that the clause "when a predetermined condition is met" in the present embodiment refers to "when time elapsed from the start of lamp operation (hereinafter referred to as "elapsed time of operation") has exceeded 5 minutes". Also, the elapsed time of operation here refers to the elapsed time of operation after a temperature of the operating lamp comes to a stable state. The "stable state" here refers to a state at which a mercury vapor pressure, a light-emitting material in the discharge space, is approximately at a predetermined value. Also, the elapsed time of operation is measured for each lamp operation from the start of the lamp operation.

2-1. First Control Characteristic

As mentioned above, the solid line in FIG. 3 shows the first control characteristic. When the lamp voltage is below a first voltage value V1, a constant current control (hereinafter, referred to as "first constant current control") is performed such that the lamp power is equal to a power value W1 when the lamp voltage is equal to the first voltage value V1. Also, when the lamp voltage is equal to or above the first voltage value V1, a constant power control ("constant power control section 1" in the figure, and hereinafter referred to as "first constant power control") is performed such that the lamp power is equal to the power value W1.

Additionally, the above-mentioned first constant current control is normally performed from the start of the lamp operation, and as the lamp voltage increases, the lamp power increases simply in a linear fashion toward a switching point. Here, the first constant current control is performed with one constant current value.

It should be noted that, in FIG. 3, as described in the Background Art section, the point at which the lamp voltage is equal to the first voltage value V1 and the lamp power is equal to the power value W1 is the switching point at which the first constant current control is switched to the first constant power control. In other words, the first voltage value V1 corresponds to a switching voltage value.

2-2. Second Control Characteristic

The dotted line in FIG. 3 shows the second control characteristic. When the lamp voltage is below a second voltage value V2, a constant current control (hereinafter, referred to as "second constant current control" and is distinguished from the first constant current control) is performed such that the lamp power is equal to the power value W1. Also, when the lamp voltage is equal to or above the second voltage value V2, a constant power control ("constant power control section 2" in the figure, and hereinafter, referred to as "second constant power control" to be distinguished from the first constant power control) is performed such that the lamp power is equal to the power value W1.

The second constant current control here is performed, for instance, when a voltage supply to the lamp is turned off after maintaining a discharge thereof in the constant power control section 2. It should be noted that, here also, the first constant power control is performed with one constant current value. In addition, the power value of the second constant power control is the same as that of the first constant power control.

It should be also noted that, as shown in FIG. 3, the point at which the lamp voltage is the second voltage value V2 and the lamp power is the power value W1 is a switching point at which the second constant current control is switched to the second constant power control. In other words, the second voltage value V2 corresponds to the switching voltage value.

Consequently, the second voltage value V2 is also the switching voltage, whose voltage value is either the first voltage value V1 or the second voltage value V2, depending on whether or not the predetermined condition is met.

3. Lighting Apparatus 3-1. Structure

Figure 4:
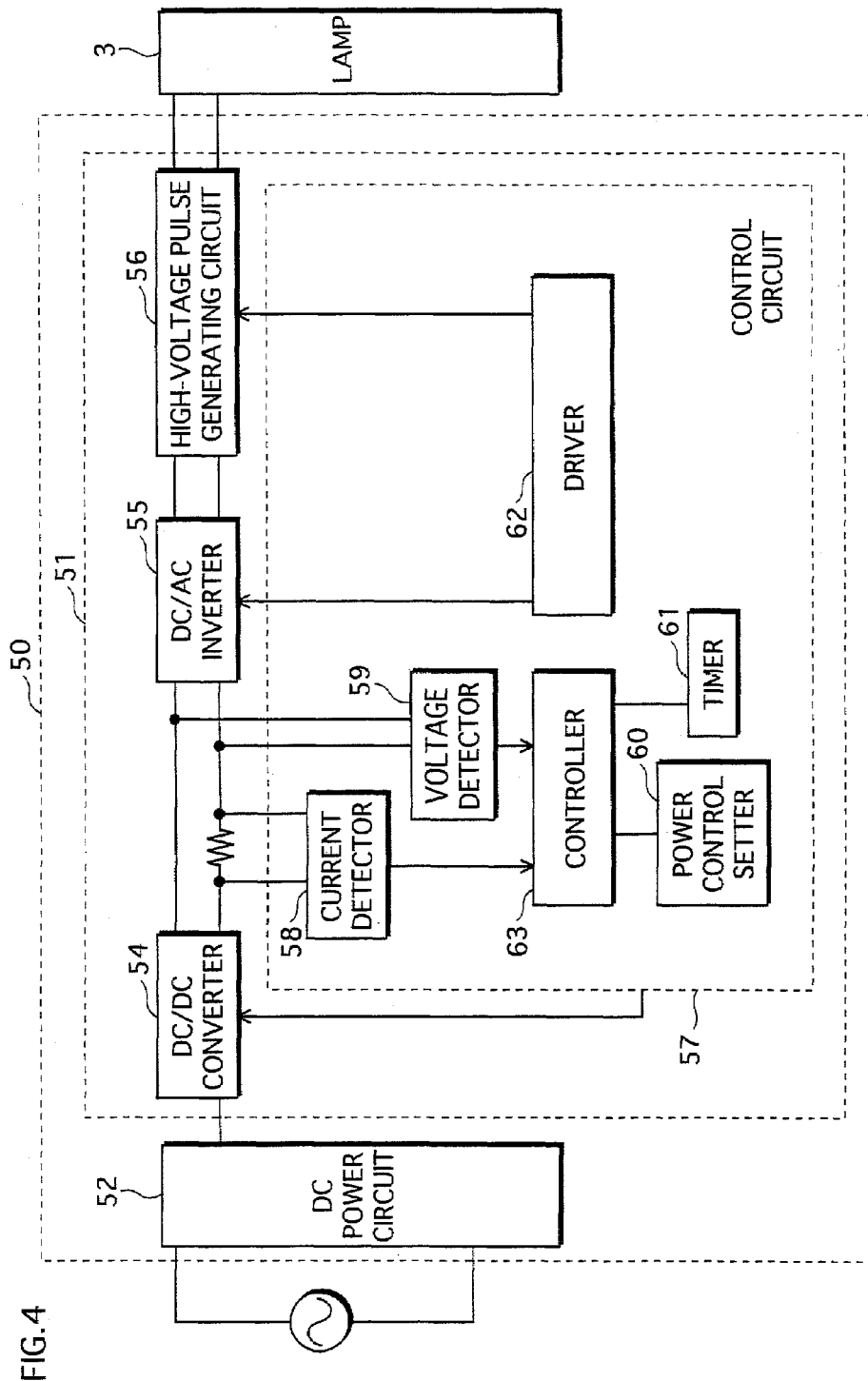
FIG. 4 is a block diagram showing a lighting apparatus for lighting the lamp.

FIG. 4 is a block diagram showing a lighting apparatus for lighting the lamp 3. As shown in FIG. 4, a present lighting apparatus 50 includes a DC power circuit 52 and an electronic ballast 51.

The DC power circuit 52 generates a DC voltage from a household AC voltage of 100 V, and supplies to the electronic ballast 51.

The electronic ballast 51 includes a DC/DC converter 54, a DC/AC inverter 55, a high-voltage pulse generating circuit 56, and a control circuit 57.

The DC/DC converter 54 converts the DC voltage supplied from the DC power circuit 52 to a predetermined DC voltage based on a power setting signal (which will be described later) received from the control circuit 57 and supplies the converted DC voltage to the DC/AC inverter 55.

The DC/AC inverter 55 generates an alternating rectangular current of a predetermined frequency from the supplied DC voltage, and applies the generated current to the lamp 3. The high-voltage pulse generating circuit 56 which is required to trigger the lamp 3 to start a discharge includes, for instance, a transformer, and the high-voltage pulse generated within the high-voltage pulse generating circuit 56 is applied to the lamp 3 to start a discharge.

As shown in FIG. 4, the control circuit 57 includes a current detector 58, a voltage detector 59, a power control setter 60, a timer 61, a driver 62, a controller 63 and the like.

The current detector 58 and the voltage detector 59, which are connected to an input side of the DC/AC inverter 55, indirectly detects the lamp current and lamp voltage of the lamp 3, respectively, and transmits a detection signal to the controller 63. The driver 62 is for driving the DC/AC inverter and the high-voltage pulse generating circuit 56.

The power control setter 60 has two tables (voltage-power). A first table which corresponds to the first control characteristic is for performing a control on maintaining a discharge of the lamp 3 in accordance with the above-described first control characteristic from the start of the operation until the predetermined condition is met; and a second table is for performing a control on maintaining a discharge of the lamp 3 in accordance with the above-described second control characteristic after the predetermined condition is met.

The timer 61 outputs to the controller 63 an elapsed time of lamp operation from the start of the lamp operation of the lamp 3 for each lamp operation.

The controller 63 has functions such as performing a constant power control based on a lamp current value detected by the current detector 58 and a lamp voltage value detected by the voltage detector 59, and outputting to the DC/DC converter 54 a power setting signal which has been set such that the lamp power and the like are in accordance with the first and second tables. The controller 63 also performs controls such as controlling the power to be applied to the lamp by selecting either the first table or the second table, depending on whether or not the predetermined condition is met.

3-2. Controls

Figure 5:
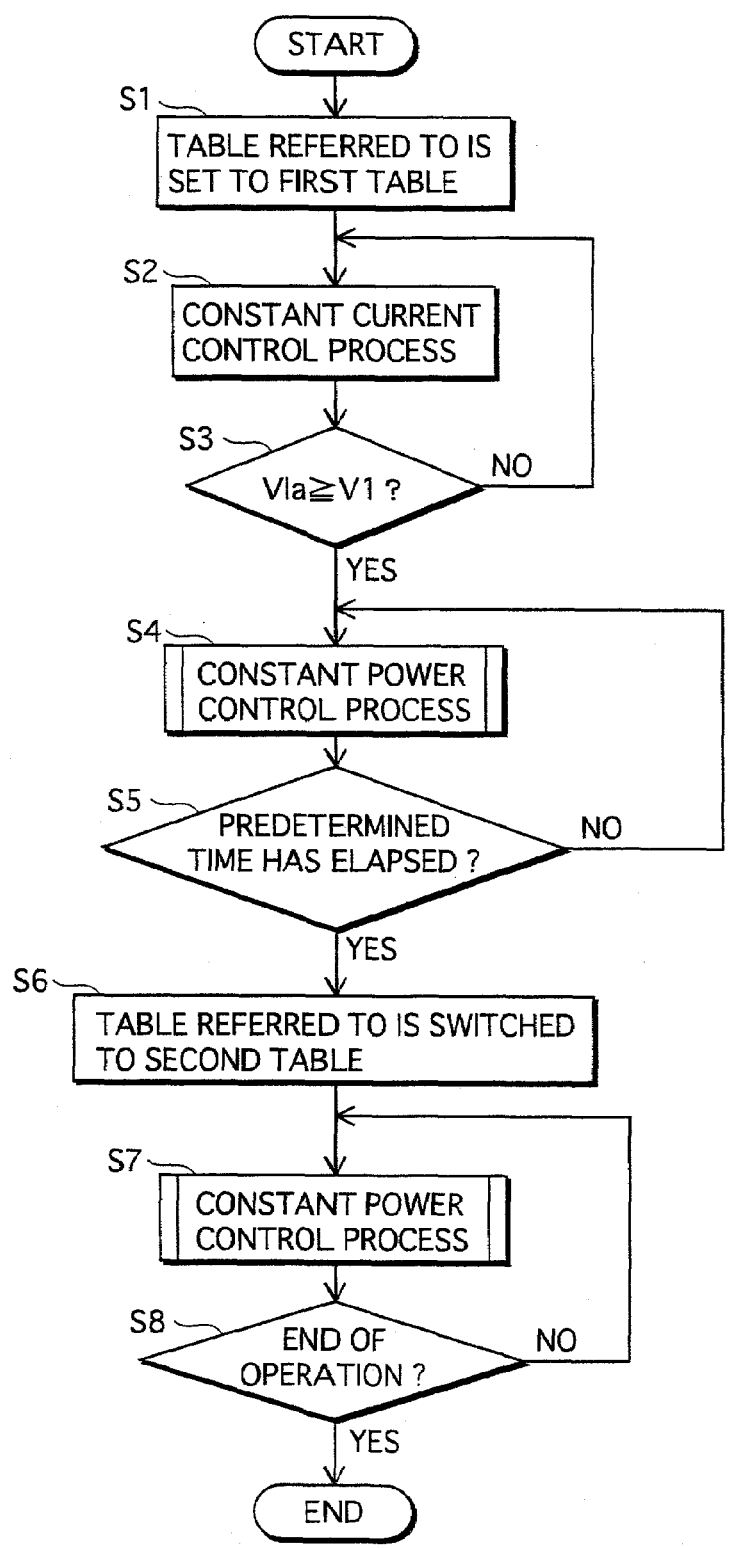
FIG. 5 is a flow chart showing a lamp operation control for the lamp pertaining to the first embodiment.

FIG. 5 is a flow chart showing a lamp operation control for the lamp pertaining to the first embodiment.

First, at a step S1, when the lamp 3 is lighted up (the elapsed time of lamp operation has not exceeded the predetermined time), the control circuit 57 selects the first table in order to maintain a discharge of the lamp 3 in accordance with the first control characteristic, and performs a constant current control process (the first constant current control) (step S1).

At a step S3, the control circuit 57 judges if a lamp voltage Vla is equal to or above the first voltage value V1 (switching voltage). If NO, the process goes back to the step S2, and if YES, the process proceeds to a step S4. At the step S4, the process is switched from the constant current control process to the constant power control process (first constant power control is performed) in which the lamp power is the power value W1 (step S4).

According to the above process, from the start of the lamp operation until the elapsed time of the lamp operation exceeds the predetermined time, when the lamp voltage is below the first voltage value V1, the first constant power control is performed; and when the lamp voltage is equal to or above the first voltage value V1 (here, the lamp power is equal to the power value W1), the first constant power control can be performed such that the lamp power is the power value W1.

Next, at a step S5, the control circuit 57 judges if a count of the timer 61 has exceeded the predetermined time. If not exceeded (NO in the figure), the process goes back to the step S4, and the constant power control process is performed, and if YES, the process proceeds to a step S6. At the step S6, a switch is made from the first table to the second table in order to maintain the discharge of the lamp 3 in accordance with the second control characteristic, and the constant power control process (the second constant power control is performed) is performed in accordance with the second table (step S7). As a result, the discharge of the lamp 3 is maintained by the constant power control.

This second constant power control is maintained until the discharge comes to an end (OFF) by, for instance, turning OFF a power supply switch (not illustrated) at a step S8 (step S8). Note that the constant power control process will be described later.

4. Embodiment 4-1. Lamp

Here, the lamp 3 is considered to be used as, for instance, a projection-type image display apparatus and the like, and thus will be described accordingly. The lamp 3 is a so-called "short arc" type lamp, where a gap (a distance between the electrodes) is set in a range of 0.5 mm to 2.0 mm in order to make the lamp closer to a point source of light.

4-2. DC/DC Converter

Figure 6:
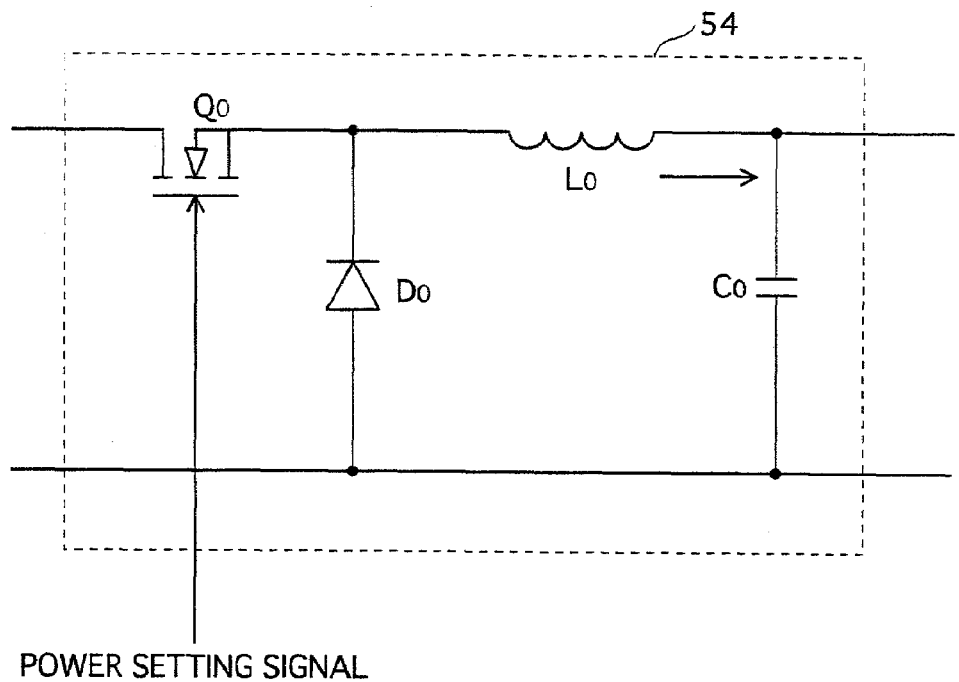
FIG. 6 is a circuit diagram of a DC/DC converter.

FIG. 6 is a circuit diagram of the DC/DC converter.

The DC/DC converter 54 includes, for example, an inductor L0, a switching element Q0, a diode D0, and a smoothing capacitor C0. In other words, the DC/DC converter 54 is a publicly known step-down converter. Note that as the switching element Q0, for example, an N-type field-effect transistor is used.

The switching element Q0 adjusts a current outputted to the DC/AC inverter 55 by switching ON/OFF based on the power setting signal. That is to say, the power setting signal is a pulse signal for the switching element Q1 to switch ON/OFF, and the output current can be adjusted by adjusting a duty ratio of this signal.

4-3. Controller

Figure 7:
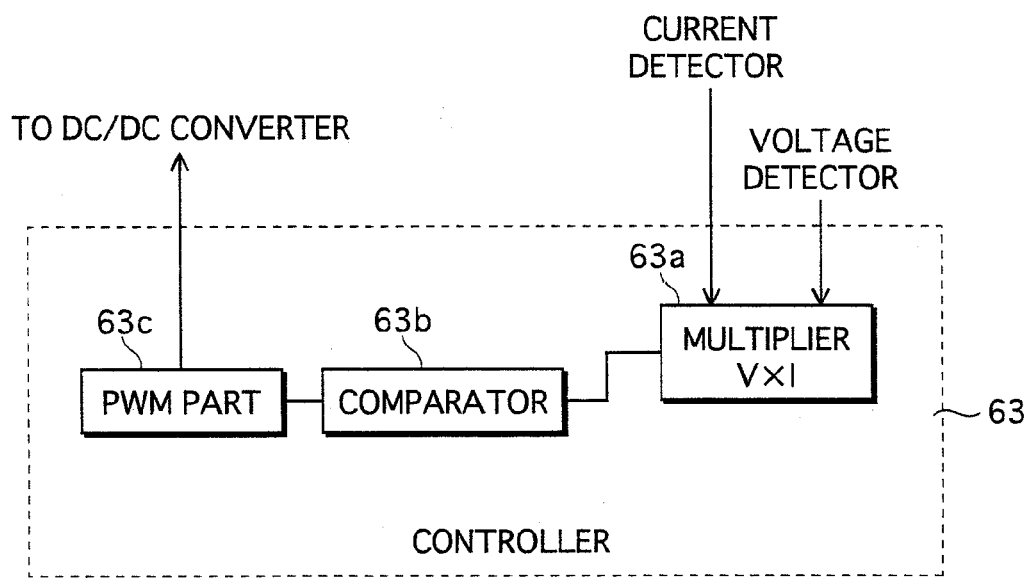
FIG. 7 is a block diagram showing an embodiment of a controller.
Figure 8:
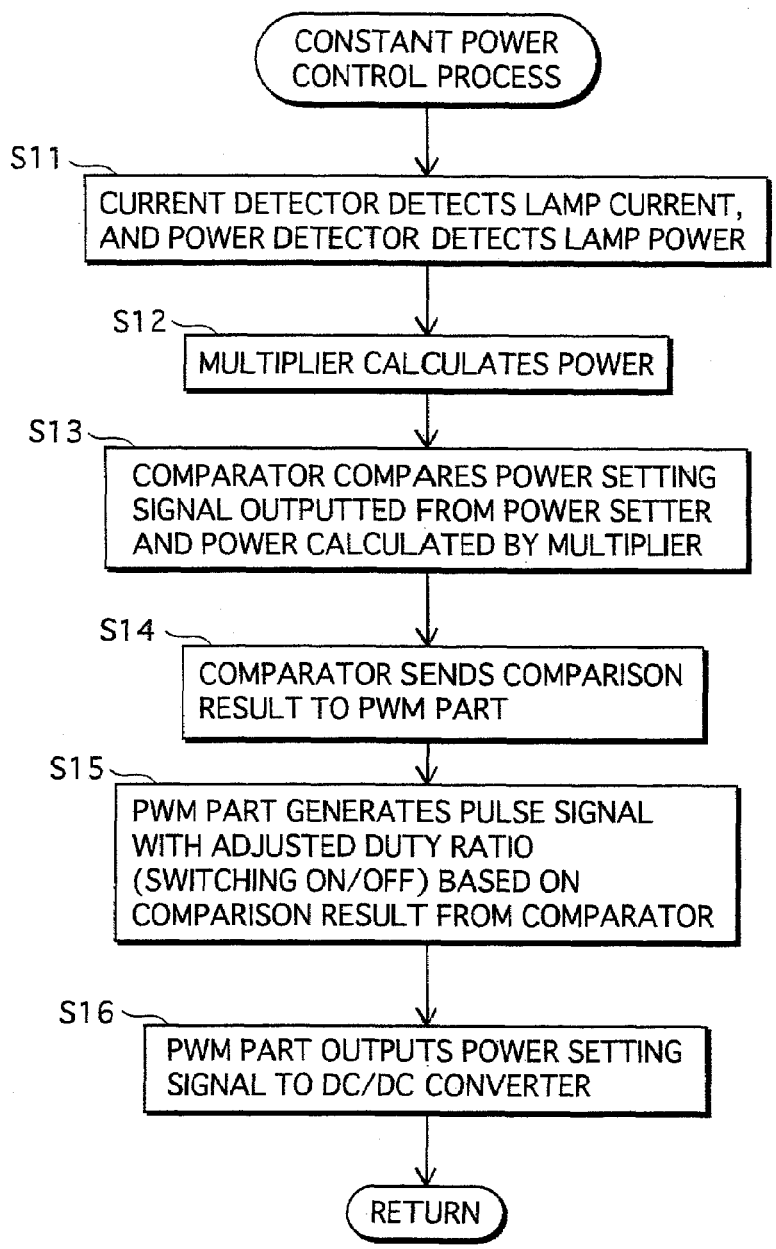
FIG. 8 is a flow chart of a constant power control process.

FIG. 7 is a block diagram showing an embodiment of the controller, and FIG. 8 is a flow chart of the constant power control process.

The controller 63 includes a multiplier 63a, a comparator 63b, a PWM part 63c and the like, as shown in FIG. 7. The controller 63 monitors the lamp current and voltage detected respectively by the current detector 58 and the voltage detector 59, and performs a feedback control on the current value that is outputted from the DC/DC converter 54 such that the lamp power calculated by multiplication by the multiplier 63a is rated at the power value W1.

As shown in FIG. 8, at a step S11, the constant power control process at the controller 63 acquires the lamp current and voltage detected by the current detector 58 and the voltage detector 59, and multiplies the lamp voltage and current together to calculate the power with use of the multiplier 63a (step S12).

At a step S13, the actual lamp power calculated by multiplication in the preceding step and the actual lamp voltage detected by the voltage detection are compared with a lamp voltage and power stored in the first or second table in advance, and a result of the comparison is outputted to the PWM part 63c (step S14). After that, the PWM part 63c generates a pulse signal whose duty ratio is adjusted based on the comparison result such that the calculated power is equal to the power value W1 stored in the first or second table (step S15).

Lastly, the signal generated in the preceding step is outputted as the power setting signal to the DC/DC converter, and the process returns to a main routine. It should be noted that the constant power control process here refers to both the first and second constant power controls.

5. Comparative Test

Described next is a comparative test conducted to compare the lighting method in accordance with the present invention and a conventional method in terms of a life characteristic of the lamp. Note that the lighting method in accordance with the present invention is referred to as "invented method", and the conventional lighting method is referred to as "conventional method" in the following description.

The lamp 3 used in the present test is as described in the above 4-1 section, and a constant lamp power (corresponds to the power value W1) is 300 (W). Additionally, the first voltage value V1 is 75 (V), and when the lamp voltage is equal to or below the voltage value V1 at the start of lamp operation, the first constant current control is performed such that the lamp current value becomes 4(A). Also, after the lamp voltage reaches the first voltage value V1, the lamp is operated under the first constant power control where the power value W1 is still 300 (W) Note that the operating frequency is 90 (Hz), and the lamp power and voltage in the invented method are the same with those in the conventional method.

On the other hand, in the invented method, when the elapsed time of operation reaches 5 (min.) the control circuit 57 switches the table referred to from the first table to the second table and maintains the discharge of the lamp 3. According to the second control characteristic, the second voltage value V2 is 50 (V). Therefore, if the lamp voltage is 50 (V) or more, the second constant power control is performed so as to make the power value W1 constant at 300 (W).

The test is a lighting test in which the lamp is turned ON and OFF repeatedly. An ON state is maintained for 2.5 hours, and an OFF state is maintained for 0.5 hour. Also, accumulated total time of the ON states is referred to as "accumulated operating time", and is distinguished from the elapsed time of operation, which corresponds to a time period of each ON state.

Measurement is made on the lamp voltage, lamp power, a central illuminance of the lamp, and lamp condition at points where the accumulated operating time reaches 5 minutes, 1 hour, 5 hours, 10 hours, 15 hours, 20 hours, 30 hours, and 35 hours. It should be noted that regarding the illuminance, emitted light from the lamp 3 is projected on a 50-inch screen using an optical system, and the measurement is made on an illuminance at the center of the screen. The lamp condition is visually observed.

FIG. 9 shows the result of the comparative test. Note that "A" in the lighting method field denotes "invented method", and "B" denotes "conventional method".

First, the lamp voltage of the invented lamp and conventional lamp both began to fall from the initial value after 1 hour had elapsed from the start of the operation, and gradually declined further as the accumulated operating time proceeded. And, after the accumulated operating time had reached 20 hours, the lamp voltage of the conventional lamp fell below the first voltage value 75 V at which the constant power control is performed, and the application of the rated power of 300 (W) to the lamp 3 stopped.

With its application condition no longer under the constant power control, the lamp 3 of the conventional method began to show a decline in the illuminance due to a lack of power and a blackening phenomenon due to a decline in the bulb temperature.

Moreover, as the accumulated operating time became longer, the lamp 3 of the conventional method started showing some problematic phenomena. Specifically, the central illuminance dropped significantly, the blackening phenomenon progressed, and the lamp 3 could not generate a discharge after 40 hours. On the other hand, although the lamp 3 of the invented method showed a significant decline in the lamp voltage after 20 hours, as was the case with the conventional method, the discharge of the lamp was maintained ON up to 1500 hours. This is due to the fact that the application of the rated power of 300 (W) to the lamp 3 was maintained as a result of changing the switching voltage from 75 V, the first voltage value V1, to 50 V, the second voltage value V2, thus inhibiting a significant drop in the central illuminance and a blackening phenomenon.

As mentioned above, the first control characteristic at the start of the operation is switched to the second control characteristic with a lower switching voltage value. And this allows the second constant power control to be performed, even when the lamp voltage, for example, falls below the first voltage value, the switching voltage of the first control characteristic, while the discharge of the lamp is maintained. Consequently, the lamp temperature can be maintained, which promotes a halogen cycle to function effectively, and the life of the lamp can be maintained.

It should be noted that the following was observed in an experiment. That is, when the switching voltage value, the switching point at which the constant current control is switched to the constant power control, is set relatively low in advance before the lamp is lighted up, an excessive current flows into the lamp when the lamp is warm-up and running-up. This damages the lamp electrodes, shortening the life of the lamp accordingly.

Second Embodiment

In the first embodiment, a description was made on the lamp unit and the lighting apparatus which lights the lamp attached to the lamp unit.

In the second embodiment, a description will be made on a DLP (registered trademark) front-projection type image display apparatus which includes the lamp unit and the lighting apparatus described in the first embodiment.

Figure 10:
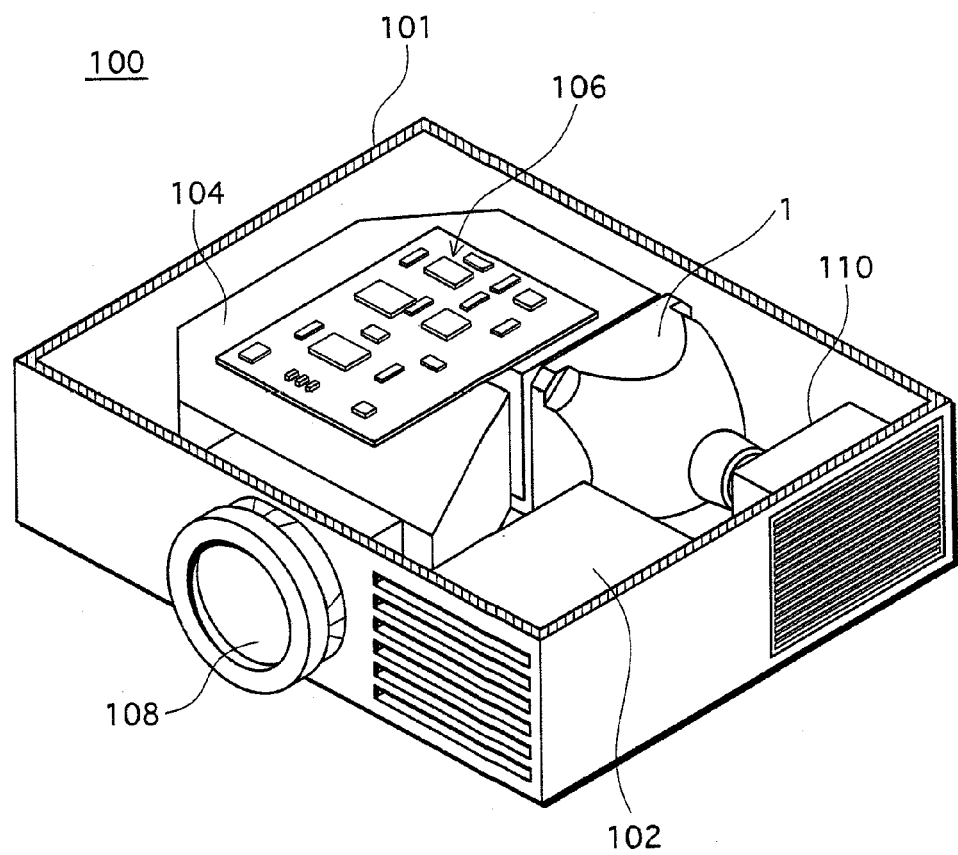
FIG. 10 is an overall diagram of a front-projection type image display apparatus of a second embodiment, where part is cut away to provide an inner view.

FIG. 10 is an overall diagram of the front-projection type image display apparatus, where part is cut away to provide an inner view of the lamp, in the second embodiment.

A front-projection type image display apparatus (hereinafter, referred to as "projector") 100 is a DLP (registered trademark) type apparatus with a single DMD (registered trademark) chip.

As shown in FIG. 10, the projector 100 is constituted from a power unit 102 including the above-mentioned lighting apparatus, the above-mentioned lamp unit 1, an image unit 104 which performs an optical system and image processing, a control unit 106 which controls the optical system and image processing, a projection lens 108, and a fan device 110 for cooling, provided in a case 101. Note that the optical system includes a DMD (registered trademark), a color wheel, an integrated rod and the like.

The power unit 102 which includes a DC power unit 52 described in the first embodiment converts an AC 100(V) power supply for home use to a predetermined DC voltage, and supplies the converted voltage to the electronic ballast 51, the control unit 106 and the like which were also described in the first embodiment.

As described in the Background Art section, this projector 100 synchronizes the rotation of the color wheel and the operating frequency of the lamp. On the other hand, when the elapsed time of lamp operation exceeds the predetermined time, the lamp lighting device provided in the projector 100 switches from the first control characteristic to the second control characteristic and maintains the discharge of the lamp, instead of changing the operating frequency of the lamp.

Accordingly, for example, when the elapsed time of the lamp operation gets lengthened and the lamp voltage falls below the first voltage value V1 of the first control characteristic, the discharge of the lamp 3 can be maintained continuously under the constant power control as long as the elapsed time of the lamp operation has reached the predetermined time. This is because when the elapsed time of the lamp operation has reached the predetermined time, the control characteristic is switched to the second control characteristic, thus the lower limit of the lamp voltage at which the second constant power control is performed has been set to the second voltage value V2, which is lower than the above-mentioned first voltage value V1. As a result of maintaining the discharge of the lamp, a decline in the optical output and a blackening phenomenon caused by the lowering lamp temperature, both being due to the lack of power in the conventional technique (lighting method) can be suppressed. Besides, since the operating frequency does not change, the lighting apparatus is suitable as a light source for the DLP (registered trademark) type display apparatus which requires a sync with the rotation of the color wheel.

Also, since such a front-projection type projector is for a large-scale public use such as for a theater and a large screen, and for a consumer, commercial use such as a portable, mobile, and home theater use, a longer life is sought after as a technology target. Therefore, a use of a light-source apparatus constituted from the lighting apparatus of the present invention can contribute considerably to an achievement of the above-mentioned technology target.

<Modifications>

Up to now, the present invention has been described through the embodiments thereof. However, the present invention is not limited to the embodiments, but can be modified in a variety of ways. The following provides examples of such modifications.

1. About First Control Characteristic 1-1. Constant Current Control

Regarding the first control characteristic, in the first embodiment, the constant current control with the lamp current being constant at 4 A is performed (the power rises at the constant current value (slope)) until the lamp voltage reaches the switching voltage (while being below the switching voltage). In other words, the control is performed such that as the lamp voltage increases (changes) toward the switching voltage, the lamp power increases with a constant slope as well.

However, the constant current control of the present invention is required to do no more than increasing the lamp voltage toward the switching voltage. Accordingly, for example, 2 or more current values can be used to maintain the discharge of the lamp. The following describes the (first) constant current control with 2 current values as a first modification.

Figure 11:
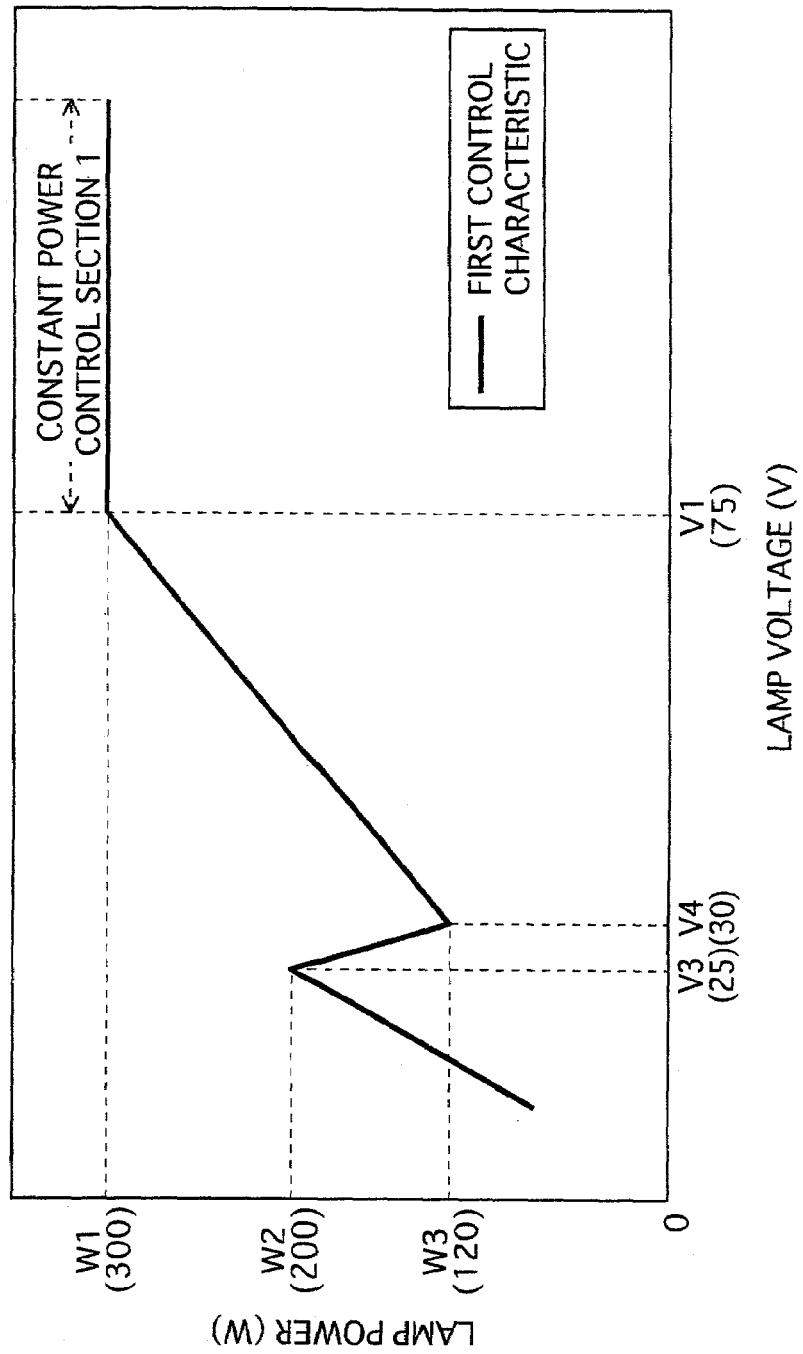
FIG. 11 is a diagram showing a first control characteristic in a first modification.

FIG. 11 is a diagram showing the first control characteristic in the first modification.

It should be noted that FIG. 11 shows the characteristics of the lamp voltage (V) and lamp power (W) supplied after generating a breakdown by applying a high-voltage pulse to the lamp. The case used as the comparative example in the first embodiment, where a rated power of 300 W lamp is lighted up, is described as an example in the following.

In the lamp, after the breakdown, a mercury vapor pressure increases as the temperature in the discharge space rises, and the lamp voltage gradually increases as well. When the lamp voltage is at a third voltage value V3 (for example, 25 (V)), a second current value (for example, 8 (A)) is applied to the lamp until the lamp power value reaches a second power value W2 (for example, 200 (W)). And, after the lamp power value reaches the second power value W2, the lamp power is lowered temporally to a third power value W3 (for example, 120 (W)).

After that, the current is applied to the lamp at the first current value (for example, 4 (A)) from the point at which the lamp voltage is at a fourth voltage value V4 (for example, 30 (V)) and the lamp power is at the third power value W3, to the switching point (at which the lamp voltage is at the first voltage value V1 and the lamp power is at the first power value W1) in the first embodiment.

It should be noted here that the switching voltage, a switching criterion for the first constant current control to be switched to the first constant power control, is the same as in the first embodiment.

In this case as well, basically, the second control characteristic is the same as in the first embodiment. Accordingly, for example, even when the lamp voltage falls below the first voltage value V1 during an discharge, because the lower limit of the voltage value at which the second constant power control is performed has been lowered to the second voltage value V2 being lower than the first voltage value V1, the second constant power control is performed. As a result, effects equal to those in the first embodiment can be obtained.

It should be noted here that, according to the first characteristic, if the predetermined condition is not met, the constant current control is switched to the constant power control when the lamp voltage reaches a voltage equal to or more than the switching voltage. However, when the lamp voltage falls below the switching voltage after the constant power control is performed, the constant power control is switched to the constant current control (for example, when the lamp is turned off).

1-2. First Voltage Value V1

The first voltage value V1 is the switching point between the first constant current control and the first constant power control. This first voltage value V1 is determined by a kind of the lamp (there are more than one kind such as a rated power 300 W type or a 150 W type).

That is to say, by adjusting the lamp power (lamp current, lamp voltage and the like), the distance between electrodes and the like, a lamp is designed to have a desired illuminance when applied a predetermined rated power. Accordingly, the voltage and current that provide the desired illuminance differ depending on the kind of the lamp.

Therefore, the "first voltage value V1" is a characteristic specified to be unique to the lamp when each lamp is designed (after a verification by a lighting experiment and the like). But, from the perspective of the designing, it can be said that the first voltage value V1 is the lamp voltage value at which the lamp achieves the desired illuminance after beginning to emit light.

2. About Second Control Characteristic 2-1. Second Control Characteristic

In the first embodiment, after the predetermined condition is met (the elapsed time of operation has reached 5 minutes or more), the switching voltage in the first control characteristic is lowered (from the first voltage value V1 to the second voltage V2). After that, when the lamp voltage is equal to or more than the lowered switching voltage, the second constant power control is performed, and when the lamp voltage is lower than the lowered switching voltage (the second voltage value V2) (for example, when slow leak occurs), the second constant current control is performed. During the second constant power control, the lamp power is maintained at the power value equal to the constant power value (power value W1). And during the second constant current control, the lamp voltage falls in a linear fashion as the lamp voltage falls.

However, regarding the second control characteristic, when the lamp voltage is lower than the lowered switching voltage (second voltage value V2), a control can be performed to turn off the voltage supply to the lamp instead of performing the second constant current control as in the first embodiment. Alternatively, a control can be performed such that the constant current control is performed until reaching a predetermined voltage and the voltage supply is turned off when reaching the predetermined voltage.

2-1. Second Voltage Value V2

The second voltage value V2 is set to a value lower than the first voltage value V1. As described in the above section 5. Comparative Test, this is in order to prevent the lamp temperature from falling by maintaining the constant power control even when the lamp voltage falls during the discharge.

Accordingly, the second voltage value V2 is for maintaining the constant power control when the lamp voltage becomes lower than the first voltage value V1, and can be applied as long as being lower than the first voltage value V1. In other words, the second voltage value V2 can be 95(%), 90 (%), 80 (%), 70 (%), or 60 (%) in a proportion to the first voltage value V1. Also, the proportion to the first voltage value V1 can be changed depending on the kind of the lamp.

3. About Lighting Lamp

The lighting method (control characteristic) described in the first embodiment and the first modification features the following. The lamp is of the 300 W type; the first voltage value V1, the switching voltage value for the switch from the first constant current control to the first constant power control, is 75V; the elapsed time of operation is adopted as the predetermined condition; and whether or not the condition is met is determined by whether or not the elapsed time of operation is 5 minutes or more.

However, in the present invention, the lamp can be of another output type, and values such as the first voltage value V1 and the second voltage value V2, and the operating frequency and so forth are not limited to the values described in the above-mentioned embodiments and the like. That is, the specific examples described in each embodiment are examples of the present invention, and the present invention is not limited to these examples.

Also, the first and second constant power controls are controlled based on the first and second tables, thus the actual lamp power varies. The present invention assumes that the variance of the power value in the constant power control is within a range of plus or minus 5% to the specified value.

4. About Predetermined Condition

The predetermined condition in the first embodiment is the elapsed time from the start of the operation, which is measured by the timer. That is to say, the predetermined condition is the elapsed time of operation, and when the elapsed time of operation has passed the predetermined time (for example, 5 minutes), the condition is considered satisfied (strictly saying, the predetermined time of 5 minutes varies depending on the kind of the lamp and the like, but it can still be widely applicable to lamps available in the market.)

However, the switching can be performed in accordance with other conditions. For example, when the illuminance of the lamp reaches a stable state, when the lamp temperature reaches a stable state, or when the lamp voltage reaches a stable state. Note that the "lamp" here refers to, needless to say, the lamp whose discharge is maintained. Each condition is described in the following.

4-1. Illuminance of Lamp

When the predetermined condition is the illuminance of the lamp, the following method, for example, can be used to determine if the predetermined condition is satisfied. A device such as an illuminance detecting sensor for a lamp is provided, and with use of the sensor, the illuminance of the lamp is directly detected. After that, the detected value is compared with the illuminance value of the stable state, which has been determined for each kind of lamp in advance by experiment. If the two values correspond with each other, the predetermined condition can be considered satisfied.

Generally speaking, however, the lamp illuminance tends to decline as the accumulated operating time increases. Therefore, a relationship between the accumulated operating time of the lamp and the lamp illuminance can be determined in advance by experiment. In this case, the lamp illuminance can be compared with "an illuminance value at a stable state" which can be determined based on the above relationship in accordance with the elapsed time of operation.

Specifically, for example, when "the illuminance value at the stable state" corresponding to the accumulated operating time of 100 hours is 100, "the illuminance value at the stable state" can be set to 95 when the accumulated operating time is 500 hours, and set to 90 hours when the accumulated operating time is 1000 hours.

Alternatively, the lamp illuminance can be directly detected multiple times or at a predetermined pitch with use of the sensor and the like. In this case, when an amount of change in the illuminance is approximately zero, that is, a detected value is approximately equal to the previous detected value, the illuminance can be judged to be at a stable state, thus meeting the condition.

Further, for example, a length of time required for the illuminance of each lamp to reach a stable state after the lamp is lighted up can be determined by experiment. In this case, it is possible to judge the illuminance of the lamp to have reached the stable state when the determined length of time has passed after the lamp is lighted up.

4-2. Lamp Temperature

When the predetermined condition is the lamp temperature, the following method, for example, can be used to determine if the predetermined condition is satisfied. A sensor and the like is installed to measure a temperature at a chosen point of an outward surface of the light-emitting part in the discharge vessel of the lamp. By directly measuring the lamp temperature of the lamp with use of the sensor and the like, the measured value can be compared against a temperature at a stable state which has been determined for each kind of lamp by experiment. When these temperatures correspond to each other, it is possible to consider that the predetermined condition is met.

Meanwhile, a method similar to the case of the illuminance in the above-mentioned 4-1. can be adopted. That is, the lamp temperature is measured multiple times or at a predetermined pitch using the sensor and the like. And, when an amount of a temperature change is approximately zero, in other words, a measured value approximately corresponds with the previous measured value, the temperature can be judged to have reached the stable state, thus satisfying the predetermined condition.

Further, for example, a length of time required for the temperature of each lamp to reach a stable state after the lamp is lighted up can be determined by experiment. In this case, it is possible to judge the temperature of the lamp to have reached the stable state when the determined length of time has passed after the lamp is lighted up.

4-3. Lamp Voltage

When the predetermined condition is the lamp voltage, the following method, for example, can be used to determine if the predetermined condition is satisfied. The lamp voltage is monitored, and the monitored lamp voltage value is compared with a predetermined lamp voltage value for each kind of lamps. If the two voltage values correspond with each other, the predetermined condition can be considered satisfied.

Alternatively, the lamp voltage can be detected multiple times or at a predetermined pitch. In this case, when an amount of change in the lamp voltage is approximately zero, that is, a detected value is approximately equal to the previous detected value, the lamp voltage can be judged to be at a stable state, thus satisfying the condition.

Further, for example, a length of time required for the voltage of each lamp to reach a stable state after the lamp is lighted up can be determined by experiment. In this case, it is possible to judge the lamp voltage to have reached the stable state when the determined length of time has passed after the lamp is lighted up. Note that the lamp voltage is considered to become stable when a mercury vapor pressure in the light-emitting part 15 becomes stable.

5. About Switching of Lighting Condition

In the first embodiment and the first modification, when the switch is made from the first control characteristic to the second control characteristic, two switching voltage values are used in each control characteristic. That is, the switch is made from the first voltage value V1 to the second voltage value V2. However, three or more voltage values can be used to perform switches. In this case, for instance, a wide variance in the illuminance, which may rarely occur when controlling a switch with two values, can be prevented.

6. About Image Display Apparatus

As an image display apparatus having a lamp, the front-projection type image display apparatus was described in the above. Meanwhile, for example, a rear-projection type image display apparatus can be applied as well.

Figure 12:
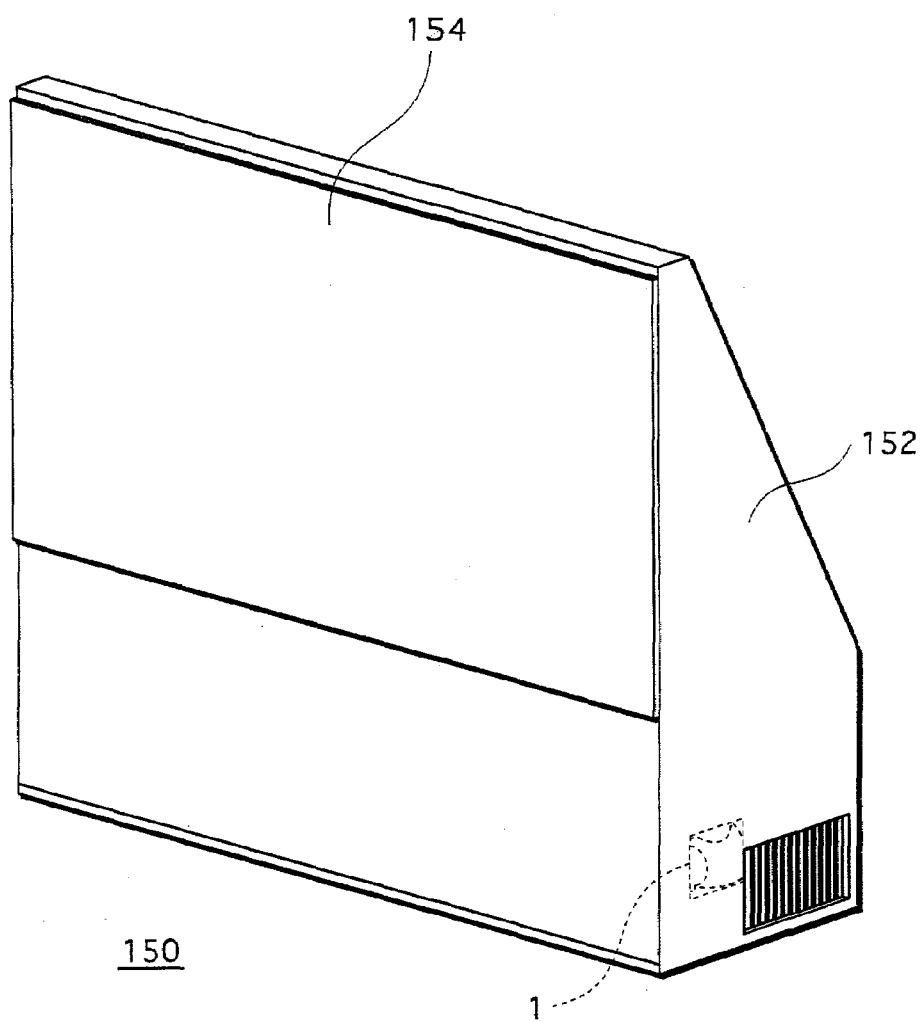
FIG. 12 is an overall perspective view of a rear-projection type image display apparatus.
Figure 13:
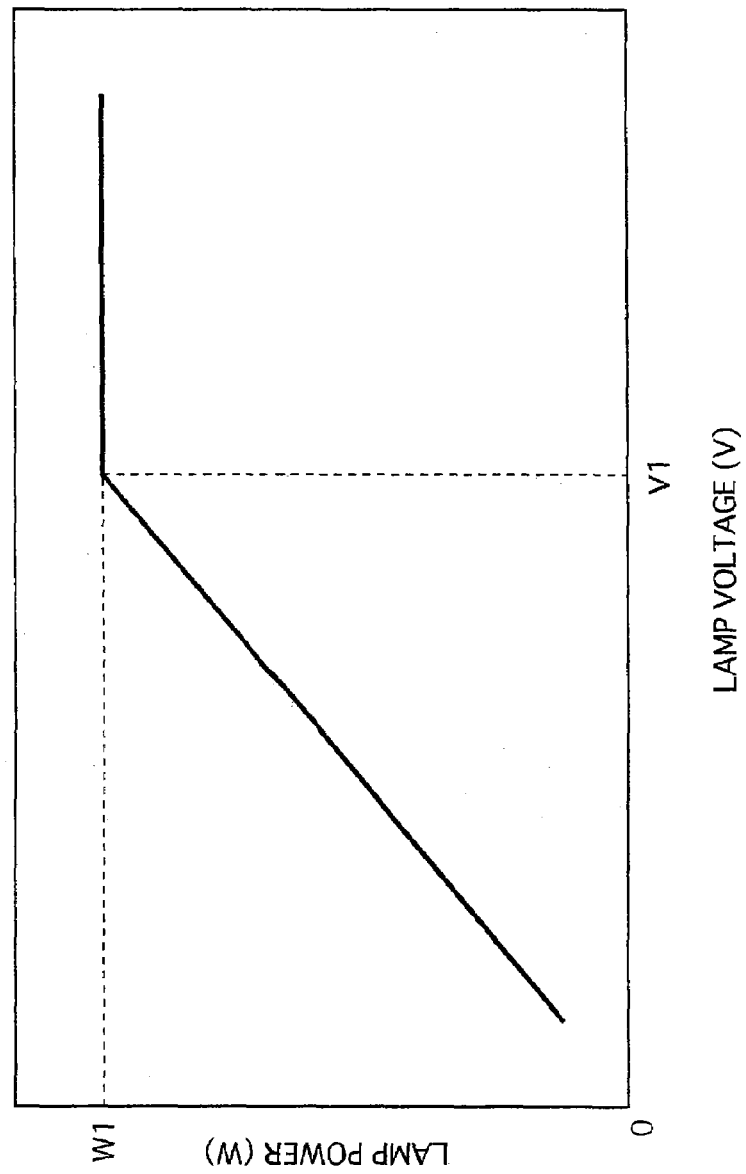
FIG. 13 is a diagram showing a control characteristic of a conventional technique.
Figure 14:
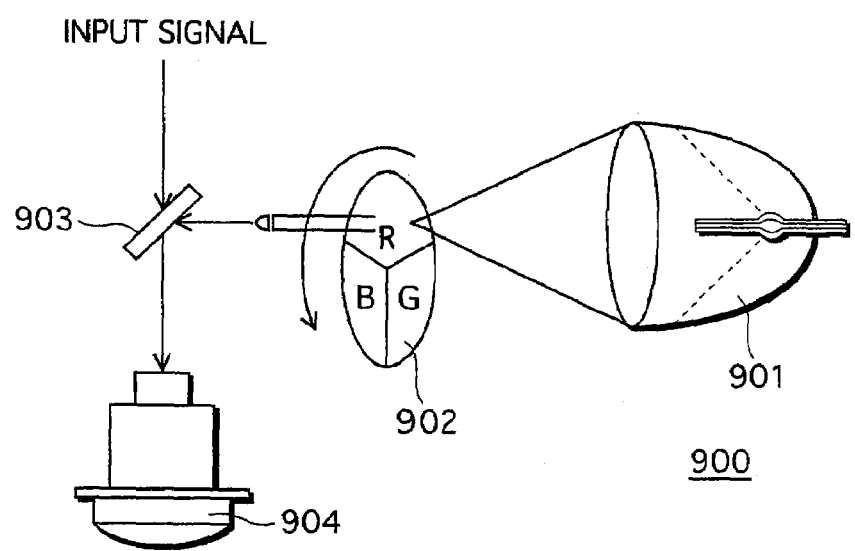
FIG. 14 is a schematic diagram showing an image display method of a projection-type image display apparatus.

FIG. 12 is an overall perspective view of a rear-projection type image display apparatus.

In the present embodiment, the projector is a front-projection type, as described above. However, a type other than the front-projection type, such as a rear-projection type shown in FIG. 12 can be applied.

A rear-projection type projector 150 includes a screen 154 which displays an image and the like on a front wall of a cabinet 152. In the cabinet 152, a power unit including the above-mentioned lighting apparatus and a lamp unit 1 are provided.

Note that while the lighting method of the present invention is particularly effective when used for a DLP (registered trademark), as the operating frequency is not changed, it can naturally be applied to projectors other than of the DLP type.

7. About Controls

In the first embodiment, the predetermined condition is assumed to be satisfied when the lamp voltage is equal to or higher than the switching voltage after the start of the lamp operation (refer to the flow chart in FIG. 5). When the lamp life nears its final stage, however, it is possible that the predetermined condition is satisfied while the constant current control of the first control characteristic is performed. In consideration of the above case, a control can be performed such that the switching is made from the first control characteristic to the second control characteristic even if the lamp voltage has not reached the switching voltage after the start of the lamp operation.

In this case, controls are performed as below. First, the controller judges whether or not the predetermined condition is met. If not met, a control is performed on the lamp power and the like in accordance with the first control characteristic; if met, a control is performed on the lamp power and the like in accordance with the second control characteristic. After that, in each control characteristic, it is judged whether or not the lamp voltage is equal to or higher than the switching voltage, and a control such as constant current control or constant power control can be performed in accordance with the result of the judgment.

8. About Relighting

In the lighting method and the lighting apparatus of the present invention, the voltage application to the lamp ends due to one of the following.

(1) The voltage application ends when, for example, the power switch is turned off.

(2) The voltage application ends when the AC power is turned off (including an electrical blackout).

When the lamp is relighted next, as shown in FIG. 5, the lamp is lighted up and the discharge is maintained in accordance with the first table (first control characteristic).

9. About Light Dimming

The lighting apparatus of the present invention may have a light dimming function. By providing a power control signal of a light dimming mode in the power control setter 60 in FIG. 4, the lighting method and apparatus of the present invention can be applied to the light dimming mode.

10. About Lamp

Although the above-mentioned embodiments and the like do not provide particular description on the lamp, the lamp 3 is of a short-arc type and, for example, constructed as below.

That is, as a light-emitting metal, for example, mercury is used, and the mercury is enclosed in a range of 0.15 mg/mm$^3$ to 0.4 mg/mm$^3$ of an internal volume of the discharge space. As a starting gas, a rare gas such as argon, krypton, or xenon is used, and is enclosed at an enclosing pressure of 5 kPa to 600 kPa when the lamp is cooled.

Also, as a halogen gas, a halogen material such as bromine or iodine is used, and is enclosed in a range of $1\times10^{-7}$ μmol/mm$^3$ to $1\times10^{-2}$ μmol/mm$^3$.

Note that regarding a lamp size, an overall length of the lamp ranges from 40 mm to 100 mm, a diameter of the light-emitting part 15 ranges from 8 mm to 15 mm, and a diameter of the sealing parts 17 and 19 ranges from 4 mm to 10 mm. Also, when a numerical range is represented as "a to b", the range is inclusive of the lower limit "a" and the upper limit "b".

When the conventional lighting method is used to light the above-configured lamp, as described in the Background Art section, a protuberance tends to be formed at a tip of electrode. Therefore, the lighting method in accordance with the present invention is particularly effective when using the above-mentioned lamp. In addition, the invention can be applied to high-pressure discharge lamps other than the high-pressure mercury lamp, such as a metal halide lamp, as long as a protuberance tends to be formed therein.

11. About Combinations

The lighting method in the first embodiment and the lighting method in the first modification can be used in combination. For instance, one such combination can be as follows. Before the accumulated operating time from the start of the lamp operation reaches 1000 hours, the control characteristic of the first embodiment is used; after reaching 1000 hours, the control characteristic of the first modification is used. Note that the accumulated operating time can be applied by using an hour meter.

INDUSTRIAL APPLICABILITY

When the lighting method and apparatus for a high-pressure discharge lamp in accordance with the present invention is applied, even when a protuberance grows as the operating time proceeds, which shortens the distance between the lamp electrodes and lowers the lamp voltage, a rated power is applied to the lamp. As a result, a decline in optical output and a shortening of the life due to blackening are suppressed. Consequently, the lighting method and apparatus which can maintain the life of the lamp can be provided. Also, by using the high-pressure discharge lamp apparatus which is a combination of the lighting apparatus and the high-pressure discharge lamp as the light-source apparatus for the front-projection and rear-projection display apparatuses, a projection-type display device with a long life can be realized.

The invention claimed is:

1. A lighting method for a high-pressure discharge lamp, in which, after the high-pressure discharge lamp has been lighted up, i) when a lamp voltage is below a predetermined switching voltage, a constant current control is performed, and ii) when the lamp voltage is equal to or above the predetermined switching voltage, the constant current control is switched to a constant power control to maintain a discharge of the high-pressure discharge lamp, wherein after the high-pressure discharge lamp has been lighted up, i) when a predetermined condition is not met, the switching voltage is set to a first voltage value V1, and ii) when the predetermined condition is met, the switching voltage is set to a second voltage value V2, which is smaller than the first voltage value V1.

2. The lighting method of claim 1, wherein the predetermined condition is met when one of i) an illuminance of the high-pressured discharge lamp, ii) a temperature of the high-pressured discharge lamp, and iii) a lamp voltage of the high-pressured discharge lamp reaches a stable state.

3. The lighting method of claim 1, wherein the predetermined condition is met when the discharge of the high-pressure discharge lamp has been maintained for more than 5 minutes after being lighted up.

4. A lighting apparatus for a high-pressure discharge lamp, in which, after the high-pressure discharge lamp has been lighted up, i) when a lamp voltage is below a predetermined switching voltage, a constant current control is performed, and ii) when the lamp voltage is equal to or above the predetermined switching voltage, the constant current control is switched to a constant power control to maintain a discharge of the high-pressure discharge lamp, the lighting apparatus comprising:

a judging unit operable to judge whether or not a predetermined condition is met after the high-pressure discharge lamp has been lighted up; and a voltage-switching setting unit operable to i) set the switching voltage to a first voltage value V1 when the predetermined condition is not met, and ii) set the switching voltage to a second voltage value V2, which is smaller than the first voltage value V1, when the predetermined condition is met.

5. A light-source apparatus comprising a high-pressure discharge lamp and a lighting apparatus for lighting the high-pressure discharge lamp, wherein the lighting apparatus is the lighting apparatus of claim 4.

6. A projection-type image display apparatus including the light-source apparatus of claim 5.

7. The projection-type image display apparatus of claim 6, adopting a digital image projection method using a micromirror display device.

* * * * *